(12) United States Patent
Stange

(10) Patent No.: US 7,930,945 B2
(45) Date of Patent: Apr. 26, 2011

(54) METHOD FOR MEASURING THE FLOW VELOCITY OF A MEDIUM WHILE APPLYING A MAGNETIC FIELD TO THE MEASUREMENT VOLUME PUT THROUGH

(75) Inventor: Gerd Stange, Nortorf (DE)

(73) Assignee: Zylum Beteilgungsgesellschaft mbH & Co. Patente II KG, Schoenefeld/Waltersdorf (DE)

( * ) Notice: Subject to any disclaimer, the term of this patent is extended or adjusted under 35 U.S.C. 154(b) by 0 days.

(21) Appl. No.: 12/529,977

(22) PCT Filed: Mar. 5, 2009

(86) PCT No.: PCT/EP2008/052683
§ 371 (c)(1),
(2), (4) Date: Nov. 24, 2009

(87) PCT Pub. No.: WO2008/107460
PCT Pub. Date: Sep. 12, 2008

(65) Prior Publication Data
US 2010/0101330 A1   Apr. 29, 2010

(30) Foreign Application Priority Data

Mar. 7, 2007  (DE) .......................... 10 2007 011 394

(51) Int. Cl.
G01F 1/58  (2006.01)
(52) U.S. Cl. .................................................. 73/861.11
(58) Field of Classification Search ............. 73/862.333, 73/862.191, 861.11, 861.12; 356/601
See application file for complete search history.

(56) References Cited

U.S. PATENT DOCUMENTS

| | | | | | |
|---|---|---|---|---|---|
| 5,495,774 | A | * | 3/1996 | Klauber et al. | 73/862.333 |
| 5,686,672 | A | * | 11/1997 | Klauber et al. | 73/862.191 |
| 5,902,934 | A | * | 5/1999 | Sprague et al. | 73/779 |
| 7,028,558 | B2 | | 4/2006 | Stange | |
| 7,236,255 | B2 | * | 6/2007 | Kodama et al. | 356/601 |
| 2008/0184811 | A1 | | 8/2008 | Stange | |

FOREIGN PATENT DOCUMENTS

| | | |
|---|---|---|
| DE | 102 21 677 C1 | 4/2003 |
| DE | 10 2005 043 718 B3 | 4/2007 |
| EP | 0 770 857 A2 | 5/1997 |
| GB | 2 440 964 A | 2/2008 |
| WO | 2005/001395 A1 | 1/2005 |

OTHER PUBLICATIONS

J.G.M. Eggels, "Direct and Large Eddy Simulation of Turbulent Flow in a Cylindrical Pipe Geometry", Delft University Dissertation 1994, Delft University Press, ISBN 90-6275-940-8.
Wang, J. Z. et al.; "Numerical Simulation Modelling for Velocity Measurement of Electromagnetic Flow Meter"; Journal of Physics: Conference Series, Institute of Physics Publishing; vol. 48; No. 1; pp. 36-40; (Oct. 2006).

* cited by examiner

*Primary Examiner* — Jewel Thompson
(74) *Attorney, Agent, or Firm* — Panitch Schwarze Belisario & Nadel LLP

(57) ABSTRACT

A method is provided for measuring the mean flow velocity of an electrically conductive medium while applying a magnetic field to the measurement volume put through and decoupling an electric signal induced in the measurement volume. The fluctuating part of the electric signal, which is based on stochastic fluctuations of the flow velocity due to turbulent motion, is captured as a time-dependent wanted signal. By the weighted integration of the wanted signal the mean flow velocity over predefined time intervals is determined.

8 Claims, 3 Drawing Sheets a b c d

METHOD FOR MEASURING THE FLOW VELOCITY OF A MEDIUM WHILE APPLYING A MAGNETIC FIELD TO THE MEASUREMENT VOLUME PUT THROUGH

CROSS-REFERENCE TO RELATED APPLICATIONS

This application is a Section 371 of International Application No. PCT/EP2008/052683, filed Mar. 5, 2008, which was published in the German language on Sep. 12, 2008, under International Publication No. WO 2008/107460 A1 and the disclosure of which is incorporated herein by reference.

BACKGROUND OF THE INVENTION

The invention relates to a method for measuring the flow velocity of a medium while applying a magnetic field to the measured volume fed through. In particular, the invention relates to such a method which also allows the use of temporally constant magnetic fields.

The principle of magnetic-inductive flow or throughflow measurement technology has proved itself to be outstanding in practice. It has many advantages in comparison with other measurement principles; for example, the measured values are independent of density, viscosity and—within certain limits—also of the flow profile and the conductivity of the medium, as long as the conductivity exceeds a minimum value of approx. 1 µS/cm. Additionally, sensors working according to this principle can also dispense with any constrictions or dead spaces in the measured volume. They are therefore also suitable for the measurement of dirty liquid streams which are loaded with solids. They can also be used for aggressive and corrosive fluids in the case of suitable selection of the electrically insulating inner wall lining and the type of the signal tapping.

For the most part, galvanic signal tapping is used, in which the sliver- or spherical-cap-shaped metallic electrodes, which are provided using through passages through the pipe inner wall and are of small diameter (generally a few millimeters), are directly in (galvanic) contact with the medium. They must be provided with reliable seals with respect to the pipe wall. This type of tapping stands out on account of a robust and simple setup, but is susceptible to chemical attack, deposits and abrasion at the electrodes and the seals. The control of high operating temperatures requires a careful adjustment with regard to the thermal coefficient of expansion of the electrode material and of the wall material.

These disadvantages can be circumvented by capacitive signal tapping. The electrodes are in this case not in contact with the medium, which, for its part, only comes into contact with the pipe inner wall. The design object is thus reduced to the selection of a sufficiently resistant inner wall material.

The indicated advantages of magnetic-inductive throughflow sensors—together with the two modes determined by the type of signal tapping—are responsible for the large scope of application of the magnetic-inductive measurement principle. These advantages are confronted with the disadvantage of a substantial energy outlay for the creation of the magnetic field, however. Both modes require temporally changeable magnetic fields, in order either—as in the case of galvanic signal tapping—to eliminate disruptive electrochemical potentials or, for principal physical reasons,—as in the case of capacitive signal tapping with permanently specified coupling capacitances—to achieve signal tapping at all. These fields can be generated with just one electromagnet. In the case of the magnetic-inductive throughflow and flow sensors known today, the energy requirement for the creating the magnetic field is therefore almost always covered from the electrical energy network.

This stands in contrast to the current trend for future development in sensor technology, however, which is characterized by a great interest in what are known as "energy-autarchic" systems, which cover their energy requirement from a network-independent energy source (battery, accumulator, solar cells, etc.) and in the process should achieve a service life of at least five years.

It is therefore obvious that a measuring method which is suitable in the sense of energy autarchy can only be configured convincingly in accordance with the magnetic-inductive principle if it can be based on the use of permanent magnets alone.

Corresponding solution suggestions already exist for flow and throughflow sensors with capacitive signal tapping.

Thus, it is suggested, for example in German published patent application DE 102 21 677 A1 to replace the temporally changeable magnetic field with a permanent magnetic field and the previously permanent coupling capacitances with coupling capacitances which can be controlled at a time interval, which can be predetermined, and for their part allow a capacitive signal tapping in the same time interval.

An alternative is described in German published patent application DE 10 2005 043 718 A1, in which the signal tapping is provided by controllable semiconductors—preferably field effect transistors (FETs)—on whose gates, which gates are provided with an insulating layer, the induced voltage acts directly, in that the gates are in contact with the measured medium. This practically currentless measuring method avoids the otherwise necessary charging of a capacitor in order to evaluate its charging as a measure for the flow velocity. It can nonetheless likewise be construed as a capacitive method, however, in which the voltage to be measured at the gate electrode simulates precisely this charging. The advantage lies in the fact that even small changes in the flow velocity entail an easily measurable signal in a permanent magnetic field.

It is therefore not amazing at first glance that the measured signals of a measurement setup based on a permanent magnetic field and FETs as signal tapping at a constant flow velocity are a superposition made up of a temporally constant level value with a temporally changeable slight fluctuation about the level value. Signals of this type are known per se from the very first MIDs, in which permanent magnets and galvanic tapping were used. These fluctuations can be suppressed using measurement technology or computationally eliminated in a number of known ways.

Upon reflection, the person skilled in the art may, however, see that the physical causes for the fluctuations in the two types of tapping can be significantly different. For example, random variations of the local charge distribution for the signal at the FET, which ultimately detects a spatially averaged electric field, are not very important, whilst this would have a considerable influence on the ideally punctiform galvanic electrodes. Even other material effects, particularly impurities, are in the case of FET tapping nowhere near as important as in the case of a galvanic tap.

The singly certain common cause of the signal fluctuations in both cases is the disruption of the fluid movement due to turbulence. As even in the case of intrinsically laminar flow of the fluid, small fluctuations of the flow velocity occur, e.g. due to the roughness of the pipe inner wall or the like.

Hereinafter, reference shall be made to individual results of turbulence research (see e.g. J. G. M. Eggels: "*Direct and Large Eddy Simulation of Turbulent Flow in a Cylindrical*

*Pipe Geometry*," Delft University Dissertation 1994, Delft University Press, ISBN 90-6275-940-8).

It is known from that that turbulence phenomena stretch across entire cascades with one another by energy transfer of coupled eddies which decrease in terms of their size from the largest dimensions determined by the flow geometry to the smallest dimensions which are found in the region of intermolecular spaces.

In the case of pipes with the internal diameter D, the largest eddies are characterised by a typical length scale L[m] of the size L≈0.1 D. The energy necessary to maintain the eddy is taken from the flow in that it is the flow that drives the largest eddy. By continued transfer along the energy cascade from large to smaller and smaller eddies, this energy is finally dissipated on what is known as the Kolmogorov scale, that is to say is converted to heat.

In addition to this length scale, there is a typical velocity scale, which is designated as u [m/s]. It characterizes the fluctuating velocity. In the wake of this, there appears a typical time scale which is given by the quotient L/u [s]. It can be interpreted as the typical lifetime of an eddy. Its reciprocal value u/L [1/s] describes a typical frequency scale. From this, there follows a typical energy (per unit mass) of $u^2$ [m²/s] and a typical (average) energy dissipation rate (per unit mass), which is given by the quotient of energy and lifetime $\epsilon = u^2/(L/u) = u^3/L$.

Interestingly, the average dissipation rate $\epsilon$ is not dependent on the microstructure of the medium, that is to say on its molecular properties—for example its viscosity. It is rather determined solely by the flow itself, that is to say by the flow geometry (also obstacles, surface condition, etc.) and by the average flow velocity.

This statement is of fundamental importance for turbulence theory: It states that turbulence is a property of the media flow, not however of the medium.

BRIEF SUMMARY OF THE INVENTION

It is therefore the object of the invention to provide a method for measuring flow velocity in accordance with the magnetic-inductive principle, which method on the one hand allows the use of a temporally constant magnetic field and at the same time can be carried out with any desired type of signal tapping, particularly galvanic and/or capacitive signal tapping.

It may be mentioned that talk in the following is of permanent magnetic fields exclusively. This should in no way be understood as a limitation, however. The following description remains valid even in he case of the use of alternating fields, particularly with defined time behaviour. This merely does not constitute a preferred configuration against the background of desired energy autarchy.

Every technical flow of a medium equipped with a minimum electrical conductivity through a volume permeated by a magnetic field leads to the formation of an induced electric field within this volume, which electric field consists of two signal portions superposed onto one another additively.

The first signal portion is a measure for the average flow velocity and is used by conventional magnetic-inductive throughflow and flow sensors.

The second signal portion can primarily be traced back to turbulence phenomena which are ubiquitous in flows. This is true in particular in the case of signal tapping by FETs, while in the case of galvanic tapping yet further signal causes come into consideration.

While the first signal portion is not to be separated from the slowly changeable signals which are not caused by the flow, as occur for example as electrochemical disruptive signals, the second portion is only caused by the flow and stochastic processes triggered by it. It follows from this, for example, that although the instantaneous values, e.g. the velocity, are subject to large stochastic fluctuations, their statistical average values are stable. In the case of a permanently specified geometry, they are only dependent on the flow.

According to the invention, this second signal portion, which is designated as stochastic in the following, is therefore separated from the complete signal and plotted as a time-dependent signal. The separation can in this case either take place subsequently, that is to say after the plotting of the complete signal over a defined time window, by conventional filter procedures in a process computer or right from the start by apparatus-based measures in the signal acquisition. A simple example for such measures is the integration of a capacitor into the circuit in the case of galvanic tapping. It suppresses all direct-current portions and only allows the stochastic signal to pass.

It is then found by direct comparison measurements that the amplitude and frequency spectrum characteristically depend on the average flow velocity in such a manner that the highest amplitudes occurring and the highest frequencies occurring increase monotonically with the average flow velocity. This also applies to derived values, for example the respective average values.

In this case, the average values show an astonishing stability over the stochastic signal with respect to environmental influences, particularly with respect to the temperature of the medium.

The invention is explained in more detail on the basis of drawings and temporal courses of measured values recorded by way of example.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
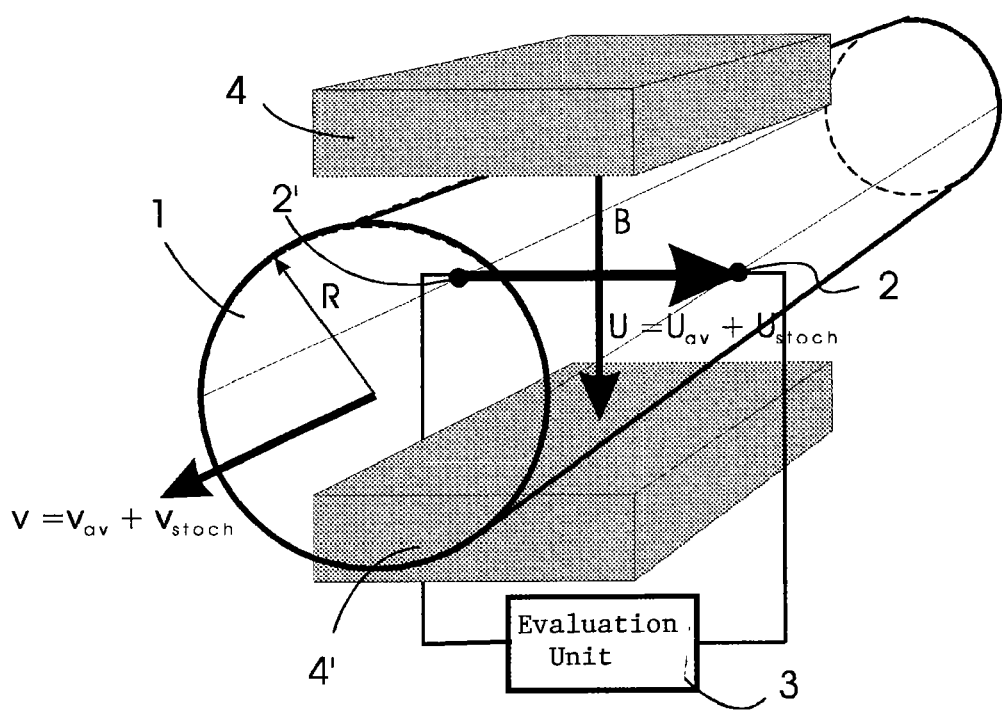
FIG. 1 is a perspective schematic view of a measuring pipe, which is suitable, for example, for carrying out the method according to the invention, with a pair of tapping electrodes, the permanent magnet and the evaluation unit.

FIG. 1 shows a smooth measuring pipe 1 produced from electrically insulating material, which has neither constrictions nor dead spaces. It is permeated by a temporally constant magnetic field of the induction B. This field emanates from the poles 4, 4' for its part, which poles are part of a magnetic circuit excited by a permanent magnet, which magnetic circuit is not shown here.

At least two electrodes 2, 2' are present for tapping the useful signal, which fundamentally consists of the superposition of a first portion $U_{av}$ which is only dependent on the average flow velocity and a second portion $U_{stoch}$ which is only dependent on the stochastic velocity fluctuations. The tapping electrodes 2, 2' can be metallic electrodes which are in galvanic contact with the measured medium. In this case, they are expediently embedded in the pipe inner wall in such a manner that they form a smooth surface with the inner wall without elevations and depressions.

It can also be capacitive electrodes which are involved, however, which electrodes are laid in the inner pipe in such a manner that they are not in contact with the measured medium. The advantages of galvanic electrodes lie in their simple and inexpensive producibility, their robustness and the long-standing experiences in the use of conventional throughflow or flow sensors. Basically, exactly the same requirements are placed on the measurement arrangement as are known from conventional magnetic-inductive sensors.

The useful signal is finally fed to the evaluation unit 3 which has the task of determining the average flow velocity from the stochastic signal portion in accordance with certain algorithms. An example for individual possible steps of such an algorithm and the evaluation results obtained therefrom is presented on the basis of a measurement which is carried out in practice, as is shown in FIG. 2.

To carry out the measurement, a closed water circuit equipped with a controllable pump is used to accommodate the measuring pipe, which is permeated by the magnetic field and has the principle construction shown in FIG. 1, as test object, wherein the throughflow is varied by controlling the pump. For the purposes of comparison, a further measuring device is present in the circuit for determining the average flow velocity, which device works with a signal tapping by field effect transistors.

The series of measurements is carried out at various flow velocities, wherein, starting from the value zero, initially a maximum value is set by a step-like change, then step-by-step reduced values down to zero are set and finally a new jump to the maximum value with subsequent return to zero is set.

Figure 2:
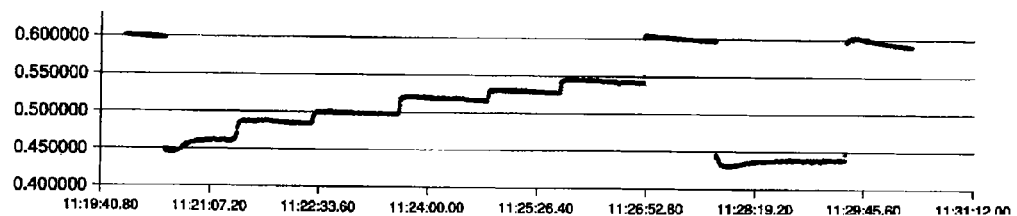
FIG. 2 is an overview over the temporal course of the stochastic signal in the case of galvanic tapping (a), the temporal course of its temporal derivation (b), the temporal course of the absolute value of the derivation (c), and the temporal course of the temporal average values calculated therefrom (d), which temporal courses are measured at a measuring pipe according to FIG. 1.
Figure 2:
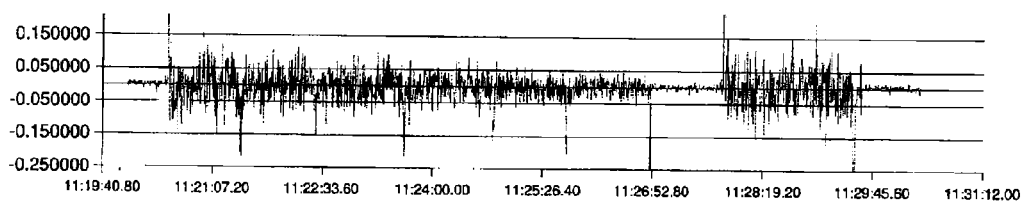
Figure 2:
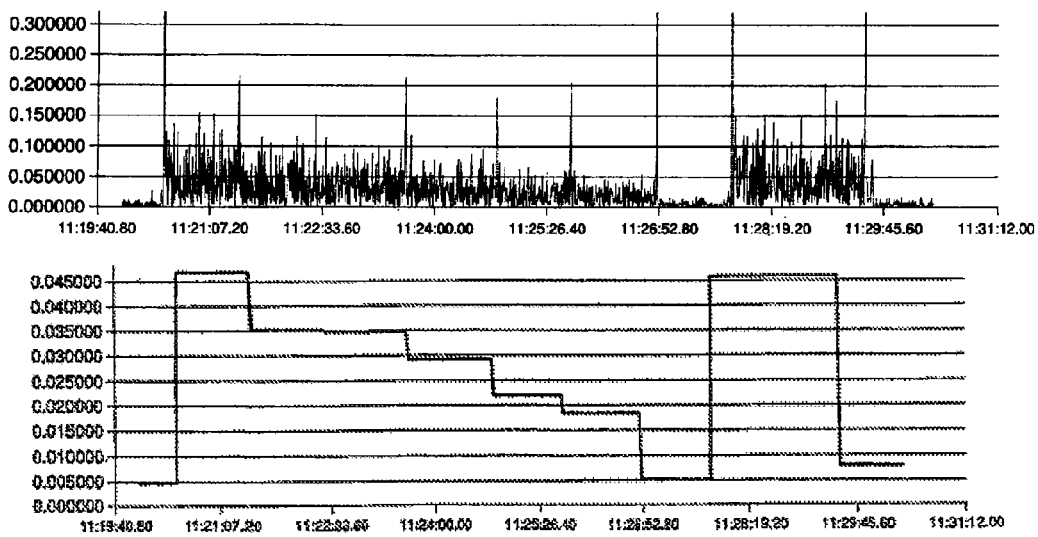

Sub-image a in FIG. 2 shows the induced complete signal tapped between two galvanic electrodes, which signal is fed to a signal amplifier with extremely high input resistance. Due to the large measuring time constant, the stochastically fluctuating signal portion is not initially visible. After the differentiation of this signal, the constant signal portions are removed and the remaining stochastic signal can be recognized easily as shown in sub-image b. Even now one can clearly see a dependence of the amplitude of the differentiated signal on the average flow velocity (cf. sub-image a).

For the further processing of the amplitude information, in sub-image c a rectification of the signal from sub-image b is undertaken. The averaging by the signal from sub-image c finally leads to the course shown in sub-image d, which course is obviously a measure for the average flow velocity and has a clearly similar time behaviour.

Figure 3:
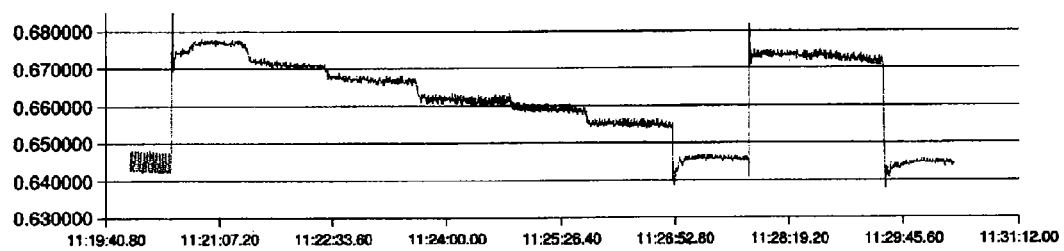
FIG. 3 is a signal, plotted at the same time as the measured values in FIG. 2, of the same volume flow through the measuring pipe, which signal results in the case of signal tapping by field effect transistors, for comparison.

FIG. 3 for comparison once again gives the course of the average flow velocity measured by another type of signal tapping. In this case, it can well be recognized that the stochastic signal portion for the tapping with FETs is not only present but is even more significantly pronounced than for the galvanic tapping.

Even in the case of multiple repetition of the measurements at different temperatures, the indicated contexts are reproduced stably again and again.

In summary—and at the same time in a somewhat generalizing manner—the algorithm for measuring the average flow velocity of the medium outlined by the sub-images a to d consists of the following sub-steps:

a) Acquisition of the stochastic signal induced by velocity fluctuations of the fluid in the magnetic field over defined time intervals as useful signal.

b) Separation of the useful signal from temporally constant (or slowly changeable in relation to the length of the selected intervals) signal portions which may be present.

c) Rectification and subsequent averaging of the useful signal.

d) Interpretation of the averages formed as a measure for the average flow velocity of the medium.

It may be clear to the person skilled in the art that the classic magnetic-inductive measuring principle is an intrinsically averaging technology. Actually, averaging is already carried out by the type of the signal recording as forms the basis of the description to this point: The interaction between the flowing medium and magnetic field leads to an induced electric field, which in terms of value and direction is determined in every point of the space by the spatial velocity and field components prevailing there. A path integral is therefore measured between two electrodes being immersed in this field at various points in each case over the electrical field strength, which path integral is none other than the electrical voltage between these points. This voltage is a measure for the average values of the flow velocity weighted with the magnetic field influence.

If the electrodes are furthermore accommodated at a distance form one another in the main flow direction, it becomes immediately clear that the spatial integral can also be understood as a temporal integral, because processes which take place temporally one after another at a location are formed by the media flow in a spatial structure. The voltage measured between two points located at a distance from one another in the main flow direction therefore essentially constitutes the time integral of the electric field strength induced at the point located upstream, which electric field strength is for its part a measure for the localized occurrence of turbulence.

Spatial and temporal integration effects can advantageously be combined by a plurality of electrodes which are accommodated at a distance form one another both in the main flow direction and transversely thereto.

To this extent, even in the case of the stochastic signal one cannot expect to be able to make statements about the average flow behaviour of the medium without temporal averaging or more generally integration over time. Although the previously described evaluation by direct calculation of average values from measured values indicates a good-natured, fundamentally linear relationship with the flow velocity, it also cannot be assumed here that this remains so under all marginal conditions. Particularly when measuring very turbulent flows, it can be advantageous to take other types of averaging, particularly those with weighting factors, into consideration. For example, it may follow from the relationship mentioned in the prior art between the velocity scale u and the frequency scale u/L that the frequency spectrum of the stochastic signal portion can also be used for evaluation.

From there, the teaching for technical processing, which characterizes the realization of the method according to the invention, should generally recommend the determination of values which result from the weighted integration of the stochastic signal over predetermined time intervals. The simplest type of weighting—weighting constant—leads to the results presented above. But even the Fourier transform, e.g. for determining the values according to the largest Fourier component or that which indicates the highest frequency occurring in the signal, is none other than weighted integration over time intervals, namely scalar product formation with harmonic functions.

To simplify the use of language, the term "integration of the stochastic signal" should of course also comprise the integration of the absolute value of the stochastic signal.

It can certainly be left to the person skilled in the art to look for useful time integrals over the stochastic signal in consideration of their actual measurement problem. The function of the present description should be seen as bringing their attention to the general reasonableness of an evaluation of stochastic MID signals, which in the prior art have hitherto only been seen as disruptive values to be removed.

In conclusion, reference shall yet again be made to the substantial apparatus-based advantages of the invention in one go:

The possible use of a constant magnetic field reduces the energy requirement by using permanent magnets and furthermore allows the problem-free integration of metallic conducting parts into the measuring arrangement, as in them, in contrast with conventional magnetic-inductive systems, no disruptive eddy current effects occur.

Likewise advantageous for the shaping of the measuring pipe is the complete freedom in the choice of the tapping method. As, according to the invention, only the stochastic signal portion is used for evaluation, both galvanic and capacitive tapping is possible. In the case of galvanic tapping, one can see it such that it is not the magnetic field direction in relation to the flow direction that changes, as is otherwise customary, rather it is completely the opposite, the instantaneous fluid movement varies with respect to the constant magnetic field, wherein one ignores the constant signal. However, the constant current is of course unavoidably present and leads, as was the case before, to the known ageing problems of the electrodes. Generally, the signal tapping by FET gates appears particularly advantageous.

A very important advantage of the method according to the invention is the comparatively small demands on the quality of the magnetic field. In particular, the requirement of its homogeneity, as exists in conventional systems, can be dispensed with completely. This has the direct consequence that the symmetry of the magnetic circuit with respect to the measuring pipe axis can be omitted. Therefore, the way to inexpensive solutions for the magnetic circuit is prepared.

Lastly, it should again be stressed that the invention is in no way similar to the method which is used in the throughflow measuring devices which are known as eddy or vortex counters. For these devices, the number of the eddies arising alternately on both sides at the edges of a disruptive body located in the middle of the flow path, which eddies form what is known as a Karman street, is measured per unit time. This number is in a known linear relationship to the medium velocity. Each eddy is in this case detected by the pressure effect emanating from it. While the macroscopically describable behavior of individual eddies is used here, the method according to the invention is based in the use of stochastic signals and their statistical regularities.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for measuring average flow velocity of an electrically conductive medium while applying a magnetic field to a measured volume fed through and tapping an electrical signal induced in the measured volume, the method comprising acquiring as a time-dependent useful signal a fluctuating portion of the electrical signal, which can be traced back to stochastic fluctuations of the flow velocity due to turbulent movement, and determining an average, particularly spatially averaged, flow velocity over predetermined time intervals by weighted integration of the useful signal.

2. The method according to claim 1, wherein the weighted integration takes place with a constant weighting function, so that average values are formed as integrals.

3. The method according to claim 1, wherein the weighted integration takes place with harmonic functions as weighting functions, so that Fourier components are formed as integrals.

4. The method according to claim 1, wherein the useful signal is rectified before the weighted integration.

5. The method according to claim 1, wherein the tapping of the useful signal takes place by influencing a conductivity of a semiconductor.

6. The method according to claim 5, wherein the tapping of the useful signal takes place by a gate electrode of a field effect transistor.

7. The method according to claim 1, wherein a galvanic tapping of the useful signal takes place at a plurality of points of the measured volume spaced apart in a main flow direction.

8. The method according to claim 1, wherein the measured volume is permeated by a permanent magnetic field.

* * * * *

UNITED STATES PATENT AND TRADEMARK OFFICE
CERTIFICATE OF CORRECTION

| | | |
|---|---|---|
| PATENT NO. | : 7,930,945 B2 | Page 1 of 1 |
| APPLICATION NO. | : 12/529977 | |
| DATED | : April 26, 2011 | |
| INVENTOR(S) | : Gerd Stange | |

It is certified that error appears in the above-identified patent and that said Letters Patent is hereby corrected as shown below:

Title Page, item (22):

The PCT filing date should read -- Mar. 5, 2008 --.

Signed and Sealed this
Fourth Day of October, 2011

David J. Kappos
*Director of the United States Patent and Trademark Office*